United States Patent [19]
Manske et al.

[11] 3,906,579
[45] Sept. 23, 1975

[54] MOTION PICTURE FILM CLEANING APPARATUS

[75] Inventors: Warren C. Manske; Robert Bretl; Carlon Strutz, all of Menominee, Mich.

[73] Assignee: Bay Electric Company, Inc., Menominee, Mich.

[22] Filed: Aug. 15, 1974

[21] Appl. No.: 497,655

[52] U.S. Cl. ................................................ 15/100
[51] Int. Cl.² ......................................... G03C 11/00
[58] Field of Search ............................. 15/100, 102

[56] References Cited
UNITED STATES PATENTS

| | | | |
|---|---|---|---|
| 1,949,868 | 3/1934 | Keuffel | 15/100 |
| 3,346,898 | 10/1967 | Stella et al. | 15/100 |

*Primary Examiner*—Edward L. Roberts

[57] ABSTRACT

A motion picture film cleaning apparatus includes a plurality of cleaning tape guides carried by the front side of panel with the motion picture film extending therebetween as it is longitudinally moved. A single cleaning tape is threaded over the cleaning tape guides with one side of the cleaning tape engaging and cleaning one side of the moving motion picture film and with the other side of the cleaning tape engaging and cleaning the other side of the moving motion picture film. Means are provided for advancing the cleaning tape over the cleaning tape guides to present fresh cleaning surfaces of the cleaning tape to the motion picture film as it engages and cleans both sides of the moving motion picture film.

6 Claims, 4 Drawing Figures

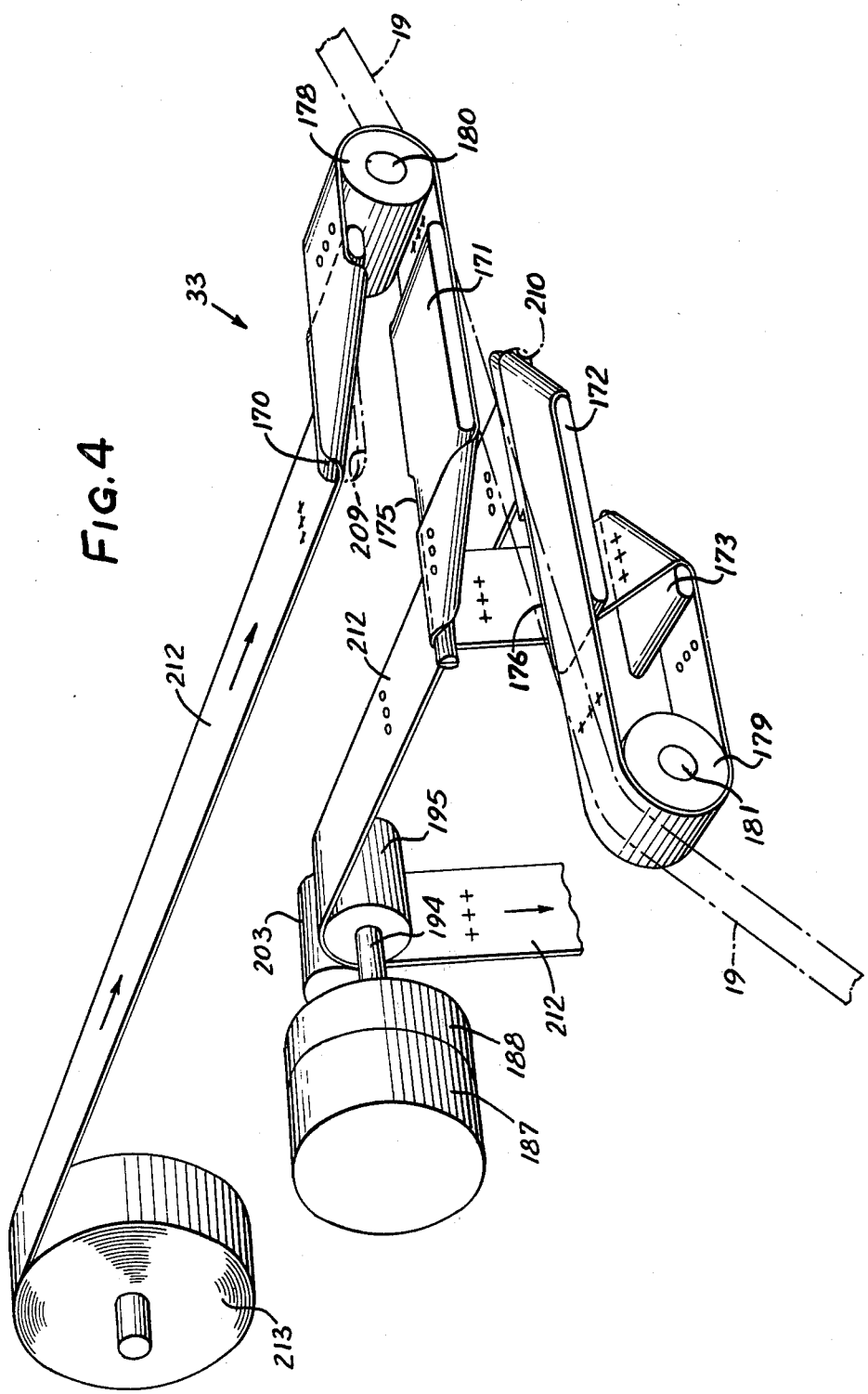

1

MOTION PICTURE FILM CLEANING APPARATUS

This invention has to do with a motion picture film apparatus for cleaning a motion picture film. The cleaning apparatus forms a part of a machine having a power operated rewind or supply reel and a power operated take up reel for moving the motion picture film through the cleaning apparatus.

Various forms of motion picture film cleaning devices have been proposed and utilized in the past as part of a complete machine, and have included devices having one set of spools containing a cleaning tape for cleaning one side of the motion picture film and another set of spools containing another cleaning tape for cleaning the other side of the motion picture film. Such devices have been cumbersome to use, they requiring the handling and application of a number of spools and cleaning tapes for the cleaning operation which are located on the front of the machine.

The principal object of this invention is to provide an improved motion picture film cleaning apparatus which can be removably and selectively incorporated as a module in the machine, which can readily clean the motion picture film in a simple and reliable manner, which eliminates the problems and deficiencies of the prior cleaning devices, which utilizes only a single cleaning tape for cleaning both sides of the motion picture film, and which is compact and simple in construction and reliable in operation.

Briefly, in accordance with this invention, the motion picture film cleaning apparatus includes a panel, such as a module panel of a film cleaning module of a machine, which can be removably and selectively incorporated in the machine to clean the film as it is longitudinally moved between the rewind reel and the take up reel operated by the machine. A plurality of cleaning tape guides are carried by the front side of the panel with the motion picture film extending therebetween as it is longitudinally moved. A single cleaning tape is threaded over the cleaning tape guides with one side of the cleaning tape engaging and cleaning one side of the moving motion picture film and with the other side of the cleaning tape engaging and cleaning the other side of the moving motion picture film. Means are provided for advancing the cleaning tape over the cleaning tape guides to present fresh cleaning surfaces of the cleaning tape to the motion picture film as it engages and cleans both sides of the moving motion picture film.

A first opening in the panel supplies the cleaning tape from a cleaning tape supply at the rear of the panel to the cleaning tape guides on the front of the panel. A second opening in the panel withdraws the cleaning tape from the cleaning tape guides on the front of the panel to the rear of the panel. The cleaning tape advancing means is carried by the rear of the panel and includes an electric motor and nipping rolls rotated thereby for gripping the cleaning tape adjacent the second opening for advancing the cleaning tape from its supply through the first opening, over the tape guides and through the second opening to a point of discharge.

The motion picture film may be readily laterally inserted between the tape guides and the cleaning tape threaded thereover.

Further objects of this invention reside in the details of construction of the motion picture film cleaning apparatus and in the cooperative relationships between the component parts thereof.

Other objects and advantages of this invention will become apparent to those skilled in the art upon reference to the accompanying specification, claims, and drawings, in which:

FIG. 4 is a diagrammatic exploded perspective view of the film cleaning apparatus illustrated in FIGS. 1 to 3 showing the course of the threading of the cleaning tape over the cleaning tape guides for cleaning both sides of the moving motion picture film.

The preferred form of the motion picture cleaning apparatus of this invention is generally designated at 33 and it includes a panel 37. The apparatus is particularly adaptable for use as a cleaning module for selective and removable incorporation in a machine having a rewind reel and a take up reel for moving the motion picture film, designated at 19, through the cleaning apparatus. In this respect, the motion picture cleaning apparatus 33 is sometimes hereafter referred to as a motion picture film cleaning module and the panel 37 thereof as a module panel.

Figure 1:
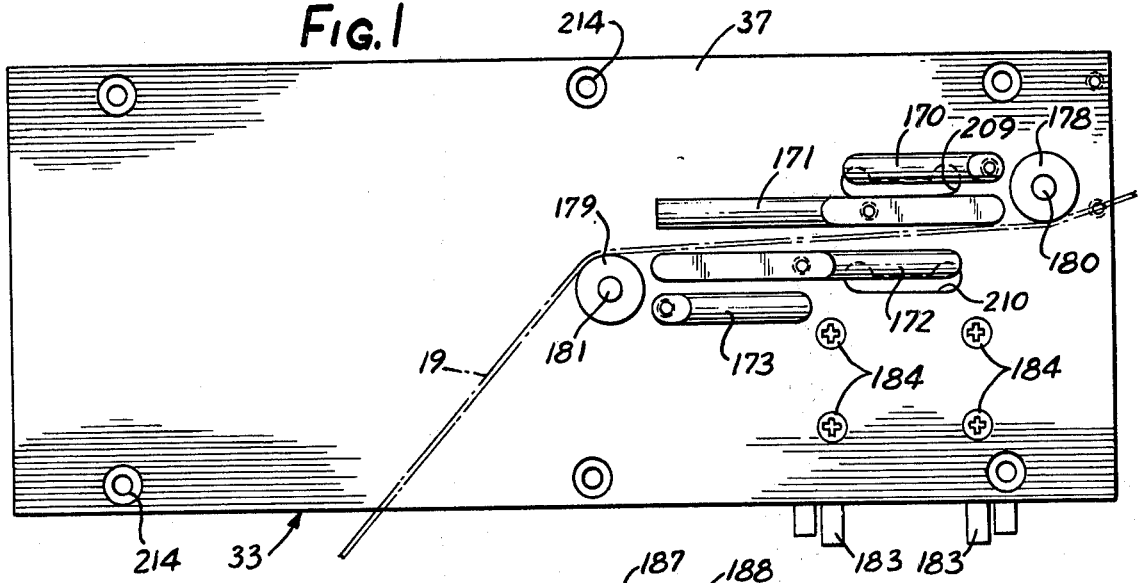
FIG. 1 is a front elevational view of the preferred form of the motion picture film cleaning apparatus with the covers omitted and with the cleaning tape omitted.
Figure 2:
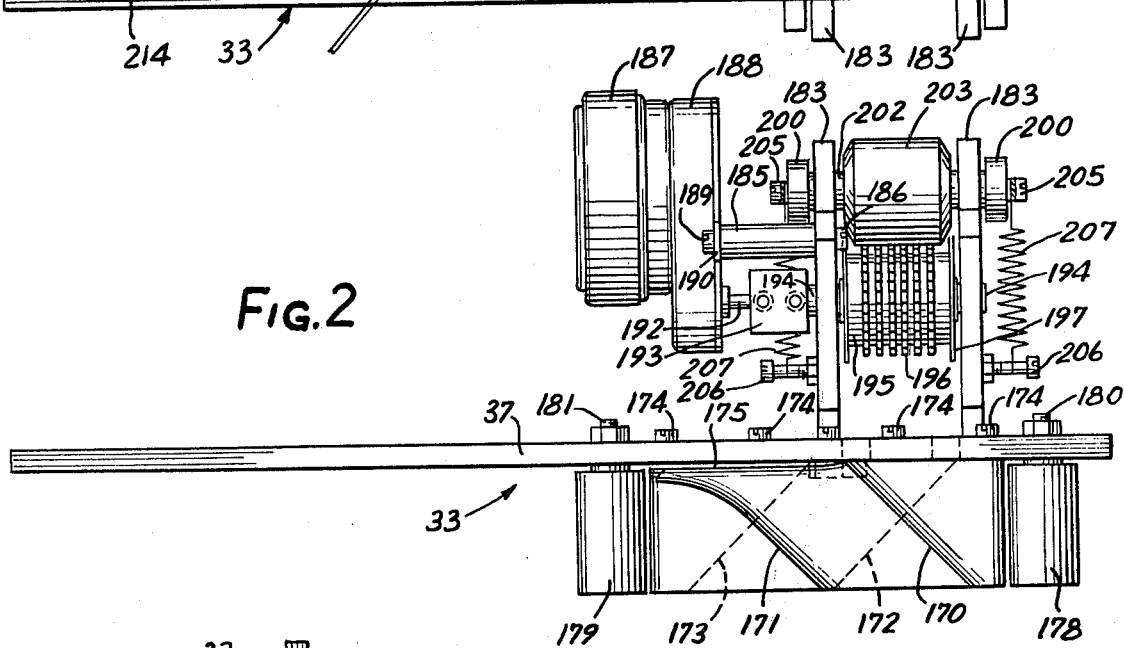
FIG. 2 is a top plan view of the cleaning apparatus illustrated in FIG. 1.
Figure 3:
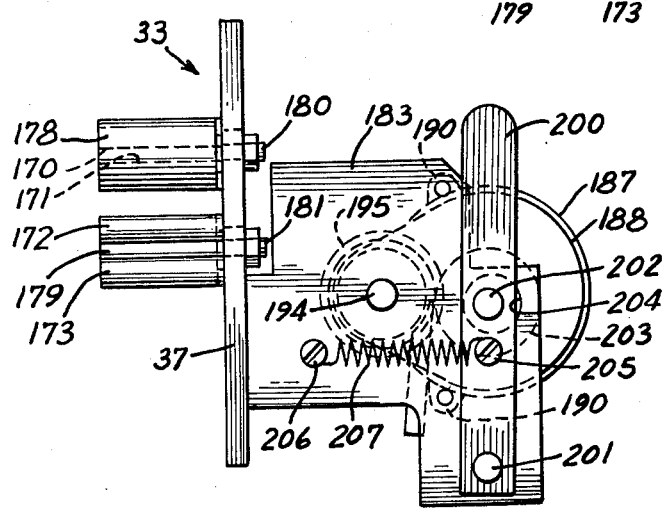
FIG. 3 is an end view of the cleaning apparatus looking from the right of FIG. 1 and with the cleaning tape guides omitted for clarity.

A plurality of tape guides 170, 171, 172, and 173 are suitably secured to the front side of the module panel 37 by means of screws 174. As shown more clearly in the diagrammatic illustration of FIG. 4 and also in FIG. 2, a portion of the rear of the tape guide 171 is rounded and spaced from the module panel 37 as indicated at 175. Likewise, a portion of the rear of the tape guide 172 is also rounded and spaced from the module panel 37 as indicated at 176. It is also noted that the ends of the tape guides 170, 171, 172, and 173 are also rounded.

A roller 178 rotatably mounted on a stud 180 carried by the module panel 37 is preferably arranged adjacent the tape guides 170 and 171. In a like manner, a roller 179 rotatably mounted on a stud 181 carried by the module panel 37 is also preferably arranged adjacent the tape guides 172 and 173.

A pair of brackets 183 are secured to the rear of the module panel 37 by means of screws 184. A pair of spacers 185 are secured by screws 186 to one of the brackets 183 for supporting a combination electric motor 187 and gear reducer 188. In this connection, the gear reducer 188 is provided with tabs 190 which receive screws 189 for securing the gear reducer 188 and electric motor 187 to the spacers 185. The gear reducer 188 operates a shaft 192 which is connected by a coupling 193 to a shaft 194 journaled in the brackets 183. The shaft 194 carries a roll 195 having end tape guide flanges 197 and serrated portions 196 between the guide flanges.

A pair of levers 200 are pivoted at 201 to the brackets 183. A shaft 202 extends between the levers 200 and is accommodated by enlarged holes 204 in the brackets 183. The shaft 202 carries a roll 203 which preferably has a resilient surface formed of rubber or the like. Each of the levers 200 has a screw 205 to which one end of springs 207 are attached. The other ends of the springs 207 are attached to screws 206 carried by the brackets 183. The springs 207 operate to resiliently urge the roll 203 against the roll 195 to form a pair of nipping rolls.

The module panel 37 is provided with an opening 209 therethrough below the tape guide 170 and it is also provided with a second opening 210 below the tape guide 172. These openings 209 and 210 are for the purpose of accommodating a cleaning tape 212. The cleaning tape is preferably formed from linen cloth or paper having good cleaning surfaces on both sides thereof.

The cleaning tape 212 is drawn from a source of cleaning tape such as a roll 213 thereof through the opening 209 and the cleaning tape 212 is threaded over the tape guide 170, the roller 178, the tape guide 171, the tape guide 173, the roller 179, and the tape guide 172 through the opening 210 to the nipping rolls 195, 203. Rotation of the nipping rolls 195 and 203 by the electric motor 187 and gear reducer 188 causes the tape 212 to advance from the roll 213 over the tape guides 170, 171, 173, and 172 and rollers 178 and 179. The motion picture film 19 extends over the cleaning tape on the roller 179 and the tape guide 172 and under the cleaning tape on the tape guide 171 and the roller 178. Thus, the motion picture film 19 engages and is cleaned by the cleaning tape 212 on the tape guides 172 and 171 and/or rollers 178 and 179.

As shown in FIG. 4, one side of the cleaning tape 212 is identified by +++ and the other side thereof is designated by °°°. The +++ side of the cleaning tape 212 is reversed by the tape guide 170 and after passing over the roller 178 and below the tape guide 171 the °°° side of the cleaning tape 212 is caused to engage one (top) side of the motion picture film 19. The cleaning tape 212 as it passes over the rear 175 of the tape guide 171 and the rear 176 of the tape guide 172 is reversed and is caused to laterally bypass the motion picture film 19. The cleaning tape 212 after passing over the tape guide 173 and roller 181 and the tape guide 172 presents the +++ side of the cleaning tape to the other (bottom) side of the motion picture film 19 for contacting and cleaning that side. The tape guide 172 then directs the cleaning tape 212 through the opening 210 in the module panel 37 to the nipping rolls 195 and 203 at the rear of the module panel 37.

By this arrangement a single cleaning tape is utilized and one side of the cleaning tape engages and cleans one side of the motion picture film while the other side of the cleaning tape engages and cleans the other side of the motion picture film. The driven nipping rolls 195 and 203 operate to continuously present fresh cleaning surfaces for engaging and cleaning both sides of the motion picture film. The rear of the module panel 37 may carry a cleaning fluid fountain for wetting the cleaning tape with a suitable film cleaning fluid, if this be desired, as the cleaning tape is being advanced through opening 209 in the module panel.

The cleaning tape guides 170, 171, 172 and 173 are provided with tapped holes for receiving screws for securing separate covers over the tape guides 170 and 171 and roller 178 and over the tape guides 172 and 173 and roller 179 for covering the same and the cleaning tape 212 guided thereby. The separate covers expose the cleaning tape 212 above the roller 179 and tape guide 172 and below the tape guide 171 and roller 178 and permit lateral insertion of the motion picture film 19 between the cleaning tape at these points. The module panel 37 is provided with mounting holes 214 for removably securing the motion picture film cleaning module 34 to a module receiving means of a machine frame.

While for purposes of illustration one form of this invention has been disclosed, other forms thereof may become apparent to those skilled in the art upon reference to this disclosure and, therefore, this invention is to be limited only by the scope of the appended claims.

We claim:

1. A motion picture film cleaning apparatus for cleaning both sides of a motion picture film as it is longitudinally moved comprising a panel, a plurality of cleaning tape guides carried by the front side of the panel with the motion picture film extending therebetween as it is longitudinally moved, a single cleaning tape threaded over said cleaning tape guides with one side of the cleaning tape engaging and cleaning one side of the moving motion picture film and with the other side of the cleaning tape engaging and cleaning the other side of the moving motion picture film, and means for advancing said cleaning tape over said cleaning tape guides to present fresh cleaning surfaces of the cleaning tape to the motion picture film as it engages and cleans both sides of the moving motion picture film.

2. An apparatus as defined in claim 1 including a first opening in the panel for supplying the cleaning tape from a cleaning tape supply at the rear of the panel to the cleaning tape guides on the front of the panel, a second opening in the panel for withdrawing the cleaning tape from the cleaning tape guides on the front of the panel to the rear of the panel, and said cleaning tape advancing means being carried by the rear of the panel and including an electric motor and nipping rolls rotated thereby for gripping the cleaning tape adjacent the second opening for advancing the cleaning tape from its supply through the first opening, over the cleaning tape guides and through the second opening to a point of discharge.

3. An apparatus as defined in claim 2 wherein said nipping rolls comprise a first roll rotated on a fixed axis by the electric motor, a second roll rotable about a movable axis carried by a pivoted lever means, and spring means resiliently urging the second roll against the first roll with the cleaning tape gripped therebetween.

4. An apparatus as defined in claim 3 wherein said first roll has a serrated surface and said second roll has a resilient surface.

5. An apparatus as defined in claim 1 wherein said cleaning tape guides cause one side of the cleaning tape to engage and clean one side of the moving motion picture film, cause the cleaning tape to laterally by-pass the moving motion picture film to the other side of the moving motion picture film, and cause the other side of the cleaning tape to engage and clean said other side of the moving motion picture film.

6. A motion picture film cleaning apparatus for cleaning both sides of a motion picture film as it is longitudinally moved comprising, a panel, a plurality of cleaning tape guides carried by the front side of the panel with the motion picture film extending therebetween as it is longitudinally moved, a single cleaning tape threaded over said cleaning tape guides, said cleaning tape guides causing one side of the cleaning tape to engage and clean one side of the moving motion picture film, causing the cleaning tape to laterally bypass the moving motion picture film to the other side of the moving motion picture film, and causing the other side of the cleaning tape to engage and clean said other side of the moving motion picture film, a first opening in the panel for supplying the cleaning tape from a cleaning tape supply at the rear of the panel to the cleaning tape guides on the front of the panel, a second opening in the panel for withdrawing the cleaning tape from the cleaning tape guides on the front of the panel to the rear of the panel, and cleaning tape advancing means carried by the rear of the panel including an electric motor and nipping rolls rotated thereby for gripping the cleaning tape adjacent the second opening for advancing the cleaning tape from its supply through the first opening, over the cleaning tape guides and through the second opening to a point of discharge.

* * * * *